(12) United States Patent
Lomax

(10) Patent No.: US 10,378,675 B2
(45) Date of Patent: Aug. 13, 2019

(54) RETAINER DEVICE

(71) Applicant: Alco Valves Group Limited, West Yorkshire (GB)

(72) Inventor: Stuart Andrew Lomax, West Yorkshire (GB)

(73) Assignee: Alco Valves Group Limited, West Yorkshire (GB)

( * ) Notice: Subject to any disclaimer, the term of this patent is extended or adjusted under 35 U.S.C. 154(b) by 156 days.

(21) Appl. No.: 15/032,221

(22) PCT Filed: Aug. 11, 2014

(86) PCT No.: PCT/GB2014/052452
§ 371 (c)(1),
(2) Date: Apr. 26, 2016

(87) PCT Pub. No.: WO2015/063448
PCT Pub. Date: May 7, 2015

(65) Prior Publication Data
US 2016/0273674 A1    Sep. 22, 2016

(30) Foreign Application Priority Data

Oct. 28, 2013   (GB) .................................. 1318975.8

(51) Int. Cl.
*F16K 35/06* (2006.01)
*F16K 35/14* (2006.01)
*F16K 27/00* (2006.01)
*F16L 55/07* (2006.01)

(52) U.S. Cl.
CPC ............ *F16K 35/06* (2013.01); *F16K 27/003* (2013.01); *F16L 55/07* (2013.01); *F16K 35/14* (2013.01)

(58) Field of Classification Search
CPC .......... F16K 35/00; F16K 35/14; F16K 35/06; F16K 35/10
USPC ............................................... 137/382, 454.6
See application file for complete search history.

(56) References Cited

U.S. PATENT DOCUMENTS

| 4,735,533 A | 4/1988 | Gallagher et al. |
| 5,350,201 A | 9/1994 | Bynum |
| 6,994,106 B1 * | 2/2006 | Hackley .................... E03B 9/06 137/382 |

(Continued)

FOREIGN PATENT DOCUMENTS

FR       2372343 A1    6/1978

OTHER PUBLICATIONS

International Search Report and Written Opinion, International Application No. PCT/GB2014/052452, dated Oct. 9, 2014, 11 pages.

(Continued)

*Primary Examiner* — P. Macade Nichols
(74) *Attorney, Agent, or Firm* — Kinney & Lange, P.A.

(57) ABSTRACT

The invention relates to apparatus and a method for the prevention of movement of a component which is provided in engagement, typically screw threaded engagement, with an article, one such article being a body of a valve assembly. The apparatus is provided in the form of a two part retaining device. One of the parts is engaged to the articles and the other part is located with respect to the component. The parts are provided with mutual engagement means, which, when engaged, are non rotatable and which, in turn, prevent relative rotation of the component with respect to the article.

17 Claims, 6 Drawing Sheets

(56) References Cited

U.S. PATENT DOCUMENTS 9,823,684 B2* 11/2017 Finley .................. G05G 1/12

OTHER PUBLICATIONS

International Preliminary Report on Patentability for PCT Application No. PCT/GB2014/052452, dated May 3, 2016, 9 pages.

* cited by examiner

Section B-B

Detial B

Section A-A

Section A-A

RETAINER DEVICE

The invention to which this application relates is an improvement to a valve assembly and, in particular, an improvement to allow the assembly to be maintained in the condition in which the same is tested prior to use and thereby maintain the safety and performance of the same during subsequent use. The invention also relates to the provision of a retainer device which is particularly, although not necessarily exclusively, of use with a valve assembly.

The provision of valve assemblies for many different industries is well known and, typically, the valve assemblies can be provided in connection with pipelines via flange connections and/or the valve assembly may be provided with at an end and/or along the valve body with one or more threaded connectors. The threaded connectors can be provided to allow the connection of other pipelines, instruments and or other valve assemblies such as vent valves. The connector is typically screwed into a threaded aperture in the valve assembly body and typically will be required to be screwed into the valve body to a pre-determined tightness and/or is provided to apply a pre-determined pressure on components within the valve body. Most typically, these connectors are attached to the valve assembly under factory conditions and most preferably, are fitted to the valve body to form the required valve assembly which is then tested under factory conditions in order to ensure that the same meets the required performance characteristics of the valve assembly type prior to the same being issued for fitment on site.

A known problem with the use of connectors which are threadedly connected into the valve body, is that there can be a tendency for the connector to either be overtightened when it is being moved into the valve body or when other components or parts are being attached thereto on site. Also, during use of the valve assembly on site, the connector can be prone to loosening from the valve body due to, for example, vibration on the pipeline and/or the valve and/or due to temperature change and/or repeated operation. It is known that if no attempt is made to mitigate this problem, then the connector may release completely from the valve body which can cause catastrophic failure of the valve assembly and/or injury or death to personnel who may inadvertently remove the connector while the valve assembly is under pressure.

Conventionally, it is known to attempt to prevent the loosening of the connector in a number of ways. For example, it is known to provide first and second ports adjacent to the hexagonal head of the connector and selectively place a pin into one of the apertures once the head and hence connector has been tightened into the valve assembly body to the required extent. The provision of the pin is such as to be located with respect to one of the flat surfaces of the hexagonal head. However, while this does prevent full rotation of the head, there is still a significant degree of play in terms of possible rotational movement of the head before the pin will contact the head to prevent further rotation. This therefore allows a degree of loosening of the connector during use. Furthermore, the ports are required to be drilled into the valve body at the desired locations, after the valve assembly has been tested and there are concerns that the drilling of these ports into the valve body may affect the integrity of the valve assembly and therefore make the testing which has been performed, irrelevant.

A further development and approach has been to provide a cam member which is received in a threaded aperture in the valve body adjacent the connector head and the cam member can be rotated once the connector has been tightened to the required extent, so as to bring the cam into contact with a flat surface of the head and thereby prevent the same from rotating during subsequent use.

Furthermore, these conventional items tend to be loaded at a single point on the valve body and if the same are damaged or fail at that point then there is no retention provided. Furthermore, the known devices are either incapable of being refitted in position (if, for example, a component has to be removed from the valve body for maintenance) or can tend to be refitted incorrectly.

A further problem which is experienced is that it can be required in many valve assemblies, to locate other accessories on the valve body such as, for example, remote actuators, pressure indicators, yolks and the like. Conventionally, in order for these to be fitted, the valve body is required to be made larger than actually required to perform the valve function in order to have the space available to accommodate the locking pin or cam screw to prevent loosening of the connector and also accommodate the fitting means for the other accessories.

The aim of the present invention is to provide apparatus for the prevention of movement of a connector which is provided in threaded engagement with a valve assembly body once the connector has been fitted to the valve body in a pre-determined manner.

In a first aspect of the invention, there is provided a retaining device for use to prevent rotation of a component relative to an article with which the component is located by a screw threaded engagement, said device comprising first and second parts, the first part having an aperture for the reception of a portion of the component, the second part including means to allow the same to be located on the article adjacent to the component and wherein said first and second parts are provided with mutual engagement means which, when engaged, prevent relative rotational movement between the first and second parts.

Thus, in accordance with the invention, the fact that the mutual engagement means of the first and second parts engage to prevent relative rotational movement of the same, ensures that the portion, typically the head, of the component cannot rotate and is therefore maintained at the required predetermined position with respect to the valve body. The portion of the component is typically provided as an integral part of the component and cannot move relative to the remainder of the component.

In one embodiment, the device prevents substantially any rotational movement of the component head in either direction thereby preventing both overtightening and loosening of the component once the device is located with the component head and article.

In one embodiment, the first part has an aperture which is shaped so as to match the shaping of at least a portion of the side walls of the component.

In another embodiment, the first part of the device is provided with an aperture through which the component passes and the aperture includes at least one portion which is shaped so as to engage with a face of the component portion and prevent any significant rotational movement of the component portion with respect to the first part.

In one embodiment, the mutual engagement means of the first and second parts comprise, in one of the first or second part, side walls at a first angle and, in the other of the first or second part, side walls at an angle, typically a different angle, said respective side walls, when engaged, preventing any significant rotational movement between the first and second parts. Typically, the respective angles of the side walls, differs so as to encourage engagement between the first and second parts as the same are located together. In one embodiment the side walls of the first and second parts are provided in a frustoconical form.

In an alternative embodiment, the respective engagement means comprise a series of teeth which are brought into engagement to prevent rotational movement between the first and second parts once the teeth are engaged.

In one embodiment, the spacing between the teeth is selected such as to provide a pre-determined restriction on the relative rotational movement between the first and second parts once the teeth are engaged.

In one embodiment, the said second part is provided with means for the location of first and second securing means which pass through the same and engage with first and second ports formed at pre-determined locations in the valve body.

Preferably, the first and second ports and apertures in the second part are provided along a common axis and located on either side of the connector portion when the device is fitted thereto.

Typically, the device is fitted to an article in the form of a valve body and the same is fitted with the component to the valve body under factory conditions and prior to the valve assembly being tested, and remains in position thereafter.

In a further aspect of the invention, there is provided a valve assembly, said valve assembly including a valve body and, at one or more locations on the valve body, there is provided a threaded aperture for the reception of a threaded component, said threaded component driven into the threaded aperture to locate the same with the valve body and wherein the apparatus includes a locking device, said locking device including a first part provided to locate with a portion of the component and a second part which is provided to be secured to the valve body and wherein the first and second parts of the device have mutual engagement means which engage to prevent relative rotational movement between the first and second parts once the said parts are respectively located with the component and the valve body.

In one embodiment, the engagement means are teeth or alternatively, are faces which are shaped so as to prevent relative rotational movement between the first and second parts when the engagement means are engaged.

In one embodiment, the means to allow the second part to be located on the valve body, comprise at least one aperture, but typically a plurality of apertures, for the reception of securing means, typically in the form of screws, which can be tightened into ports formed in the valve body to thereby secure the second part in a fixed position on the valve body.

In whichever embodiment the first part of the device may be provided as an integral part of the component and/or the second part may be provided as an integral part of the valve body. In these embodiments at least one of the fitting steps will not be required.

In a further aspect of the invention, there is provided a method of securing a threaded component in a pre-determined position on a valve assembly, said method comprising the steps of driving the threaded component into a threaded aperture in the valve body, placing a first part of a retaining device in contact with or adjacent to the component such that at least one portion of the component engages with a portion of the first part, placing a second part of the device in contact with the first part so to engage mutual engagement means and securing the second part to the valve body and wherein the engagement of the mutual engagement means of the first and second parts prevents relative rotation between the same and prevents rotation of the component with respect to the valve body.

By providing engagement means to prevent relative rotation between the first and second parts, providing the location between the aperture in the first part and the portion of the connector to prevent relative rotation between the same, and securing the second part with the valve body and trapping the first part in position, so the rotation of the connector in both tightening and loosening directions with respect to the valve body is prevented.

Typically, the securing means are provided along a common axis passing through the centre of the second part and on either side of an aperture in which the first part is received.

In whichever embodiment, the second part is provided with location means formed thereon to receive connection means for one or more accessories to be used in conjunction with the valve assembly and thereby allow the accessory to be located on the valve assembly via the second part of the device. This therefore avoids the need for direct connection between the accessory and the valve body and, furthermore, overcomes the need for the valve body to be made of a greater size than would be necessary for performance of its normal operation.

It should be appreciated that reference herein to a connector should also be interpreted as relating to any further component or accessory mounted thereon.

Specific embodiments of the invention are now described with reference to the accompanying drawings; wherein FIG. 1 illustrates an embodiment of a valve assembly in accordance with the invention.

Figure 1:
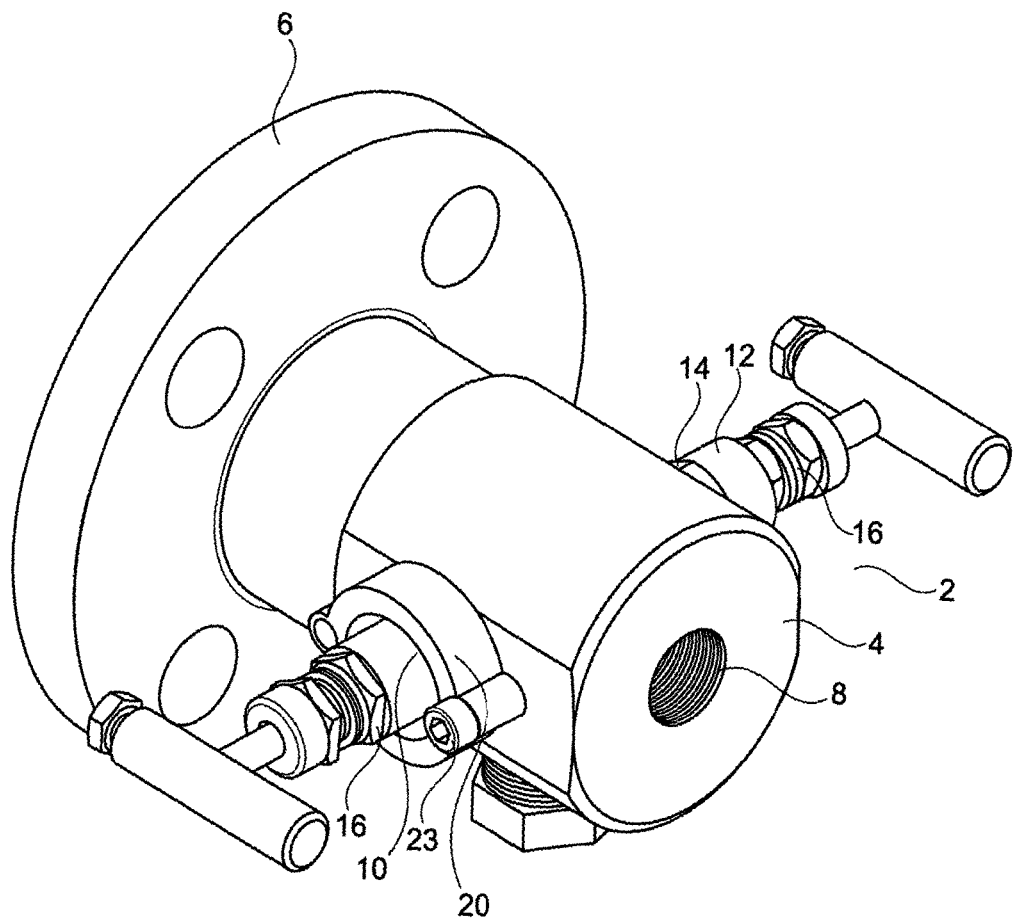

Referring firstly to FIG. 1, there is illustrated one embodiment of the invention. It should however be noted that the device may be used with other articles other than the example of an article in the form of a valve assembly as is now described. A valve assembly 2 is shown of a type with which the retaining device of the invention may be used. It should be appreciated that this is not the only type of valve assembly with which the retaining device may be used and the device in accordance with the invention may be used in conjunction with any valve assembly in which there is provided a component, in this case a component in the form of a threaded connector and reference to which is now made for ease of reference but in a non limiting manner, and which is engageable with the valve body. The valve body 4, in this case, comprises a flange connector 6 at one end, a threaded aperture 8 at the opposing end and with which a threaded connector (not shown) may be engaged. Also provided within the valve body are further threaded apertures which are engaged with respective connectors 10, 12.

Each of the connectors comprise a threaded portion which is driven into the threaded aperture in the valve body and a head portion 14 which protrudes from the valve body. A valve component, such as the vent valve shown 16, can then be engaged with the aperture in the head portion 14 so as to allow the vent valve to be in connection with the interior of the valve body and be used in a conventional manner.

With all of the connections between the connectors and the valve body, the connector is required to be driven into the valve body to a pre-determined position so that the same has a known tightness and/or exerts a required torque/force. It is therefore important that the connector head is not tightened too greatly into the valve body as it may damage components within the valve body and it is also important that the connector does not loosen from the valve body during subsequent use. In accordance with the invention, there is provided a device 20, one of which is shown in position in FIG. 1 and which is secured via securing means 23, one of which is shown, which engage with the valve body in a threaded aperture therein.

Figure 2:
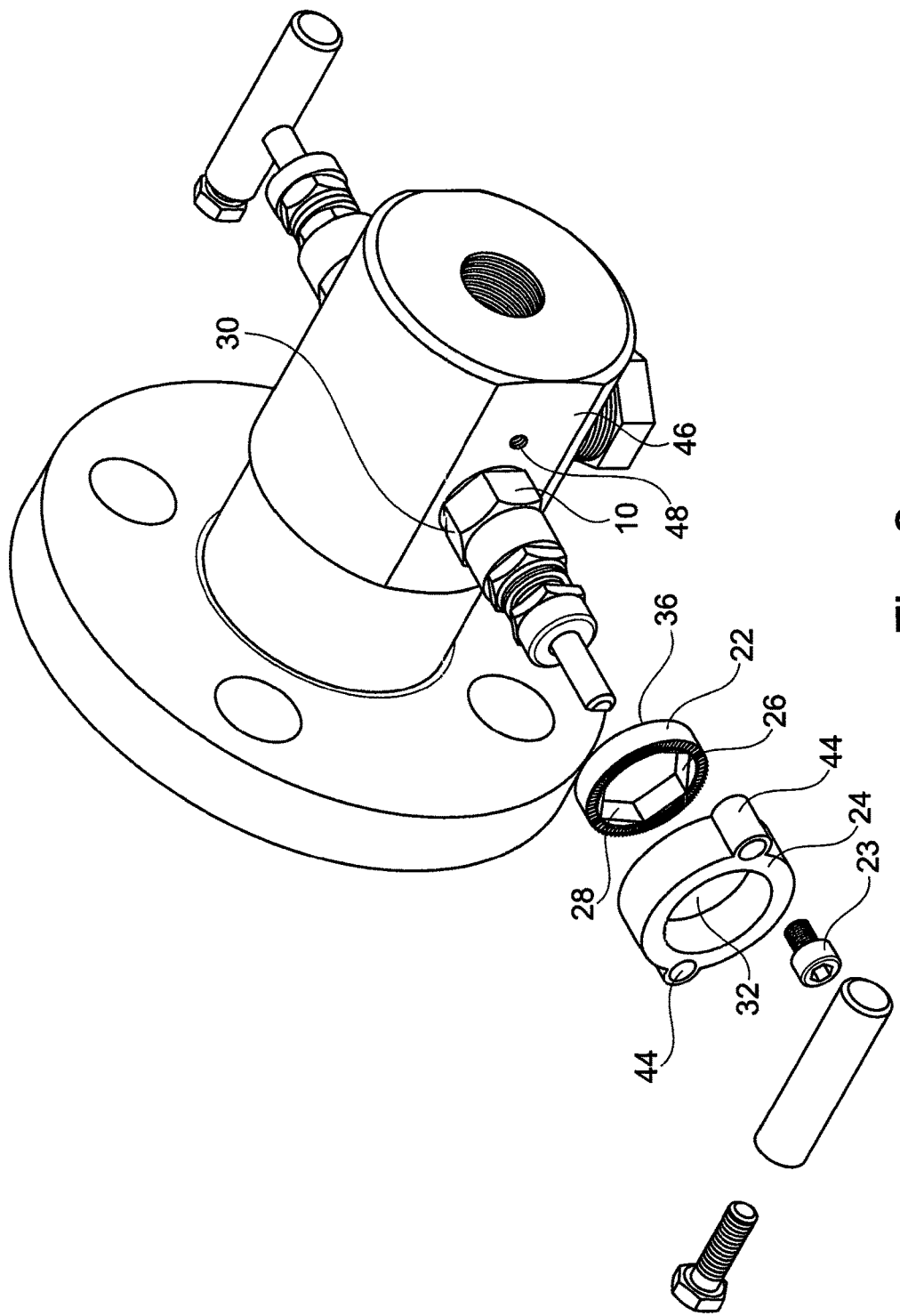
FIG. 2 illustrates the valve assembly of FIG. 1 with the components separated therefrom.

Turning now FIG. 2, the components of the device 20 are shown in greater detail and comprise a first part 22 and a second part 24. The first part 22 is provided with an aperture 26 which, in this embodiment, has a series of flat side walls 28 which are shaped so as to engage with the flat side walls 30 of the connector head 10 of the connector. The engagement between the flat side walls 28 of the first part 22 with the flat side walls 30 of the connector head 10 prevents relative rotation between the first part and the connector head when the first part is in position thereon. The second part 24 also has an aperture 32 and this aperture has a recess portion 34 which is shown more clearly in FIG. 4. The recess portion is sized so as to receive the first part 22 therein such that the end face 36 of the first part will sit substantially flush with the end face 38 of the second part 24 when the first part is received within the recess portion 34 of the aperture 32.

The second part is also provided with first and second lug portions 40 and 42, each of which, in this embodiment, has an aperture 44 passing therethrough and which, when the second part is moved onto the first part to receive the same and in turn to bring the end faces 38, 36 of the respective parts into position on the face 46 of the valve body, brings the apertures 44 into alignment with the ports 48 formed in the valve body so as to allow a securing screw 23, one of which is shown, to be passed through each of the apertures 44 and into the threaded ports 48 so as to secure the device in position on the valve body.

Figure 4:
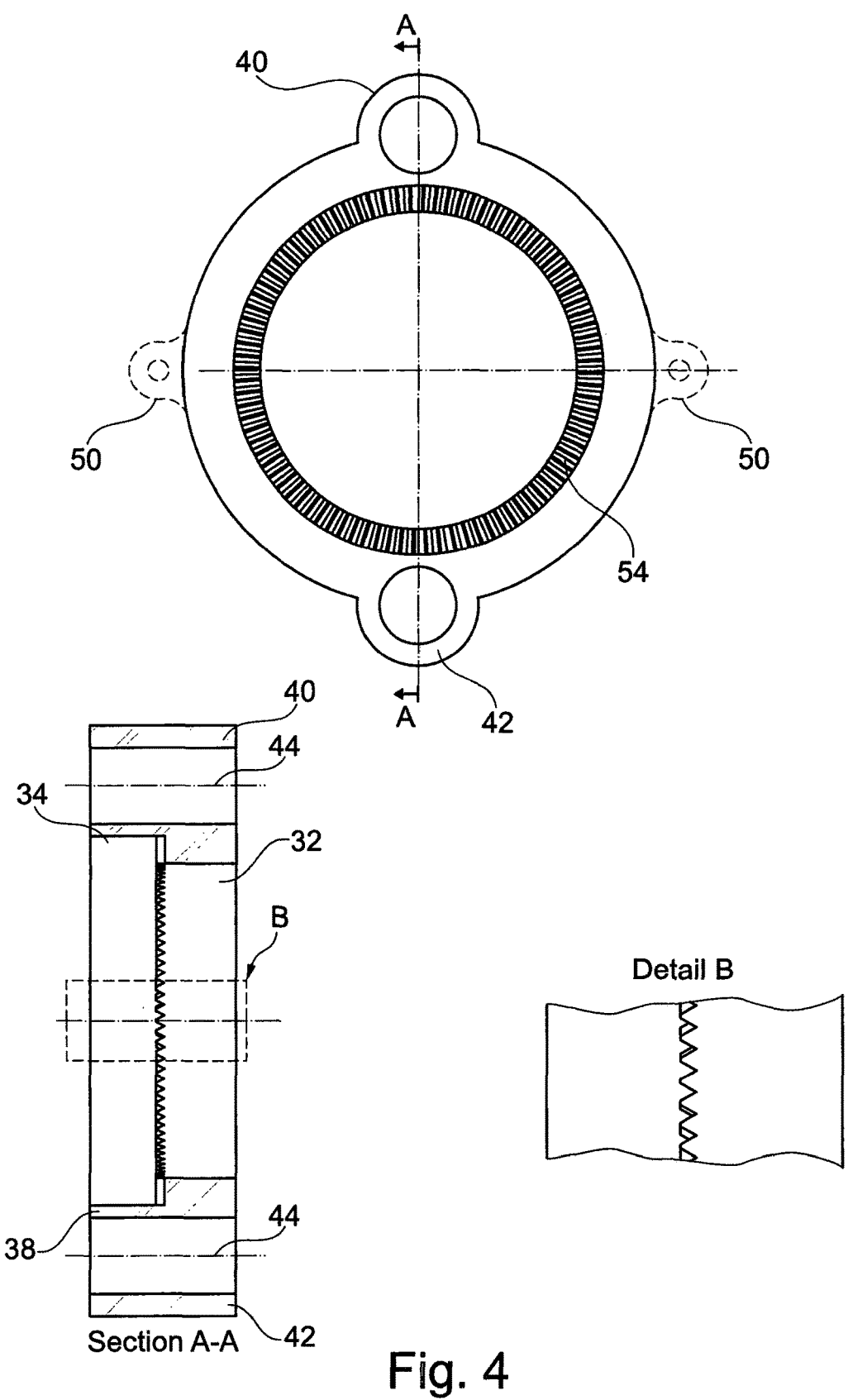
Figure 6:
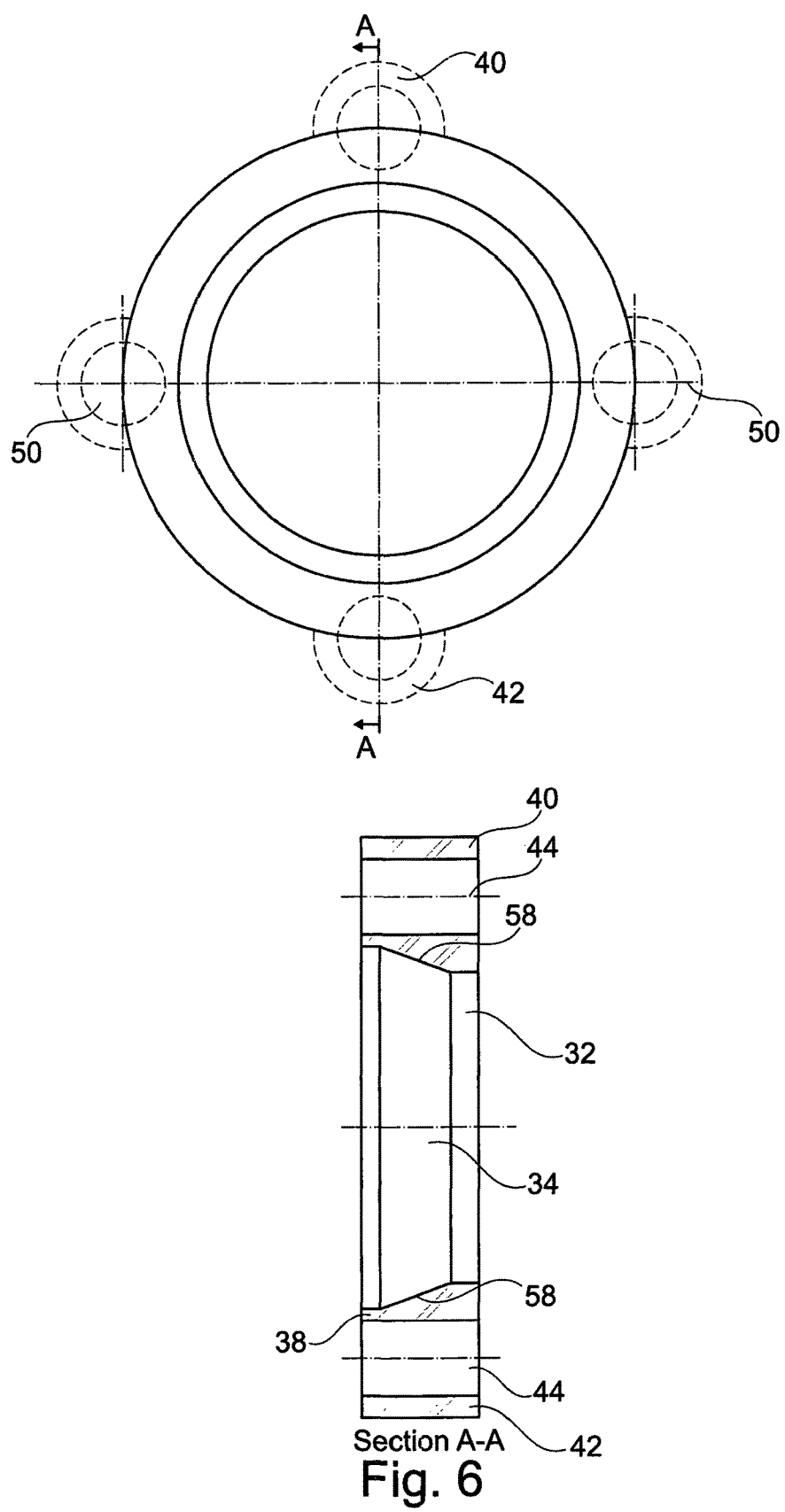

Further lugs maybe provided, as indicated in FIGS. 4 and 6 by broken lines. These lugs 50, can act as means to receive attachment means for one or more accessories which maybe used in conjunction with the valve assembly and therefore the accessories can be attached to the device rather than directly to the valve body.

As stated above, the location of the flat surfaces 28 with the flat sides 30 of the connector head, prevent relative rotation between the first part 22 and the connector head 10. In addition, mutual engagement means are provided between the first and second parts 22 and 24 to prevent relative rotation of the same.

Figure 3:
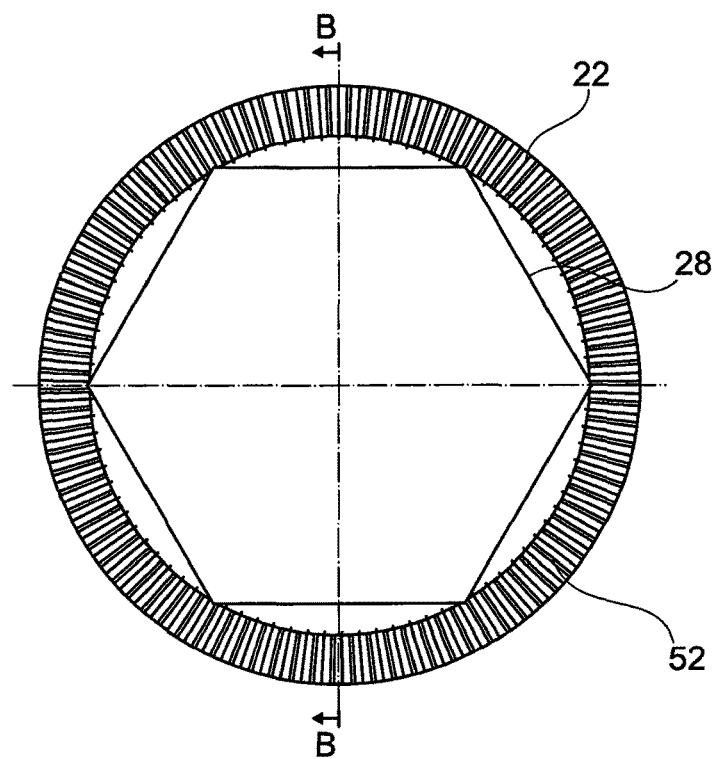
FIGS. 3 and 4 illustrate the first and second parts of the retaining device in a first embodiment.
Figure 3:
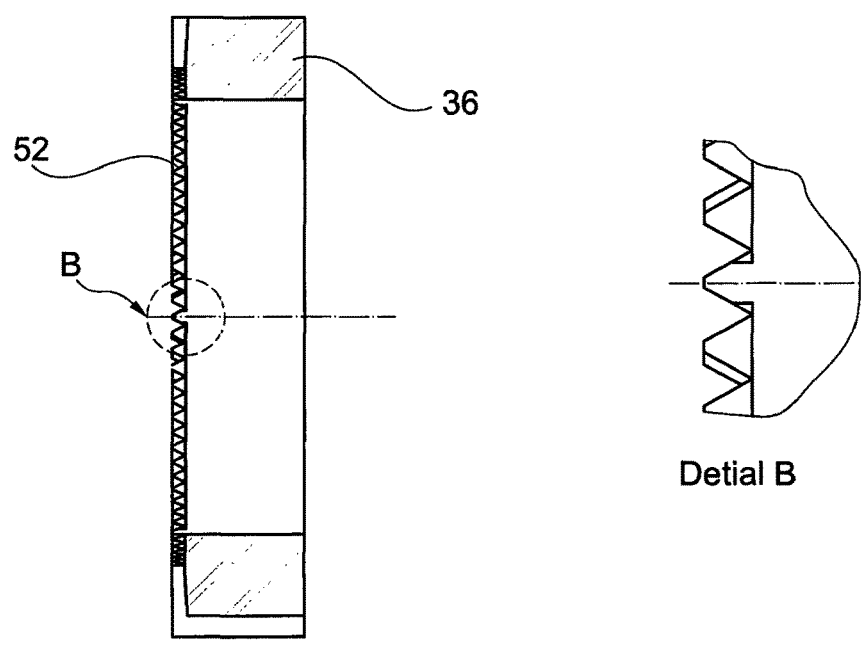

In the embodiment shown in FIGS. 3 and 4, the engagement means comprise a series of teeth 52 formed on an annular path on the first part 22 and, in this case, there are provided 90 teeth which are equally spaced through 360°. The second part 24 of the device, is also provided with a series of teeth 54 which again are provided on an annular path and again there are 90 teeth spaced equally through 360°. The respective teeth 52, 54 are located such that when the first part is received within the recess portion 34 of the second part, the teeth engage. The engagement of the teeth is such as to prevent relative rotation between the first and second parts. Thus, when the second part is secured in position on the body of the valve assembly, the same is non-rotatable with respect to the valve body. In turn, the first part is not rotatable with respect to the second part of the device due to the engagement of the teeth 52, 54 and, in turn, the connector head is not rotatable with respect to the first part of the device due to the contact between the flat surfaces and side walls 28, 30.

Figure 5:
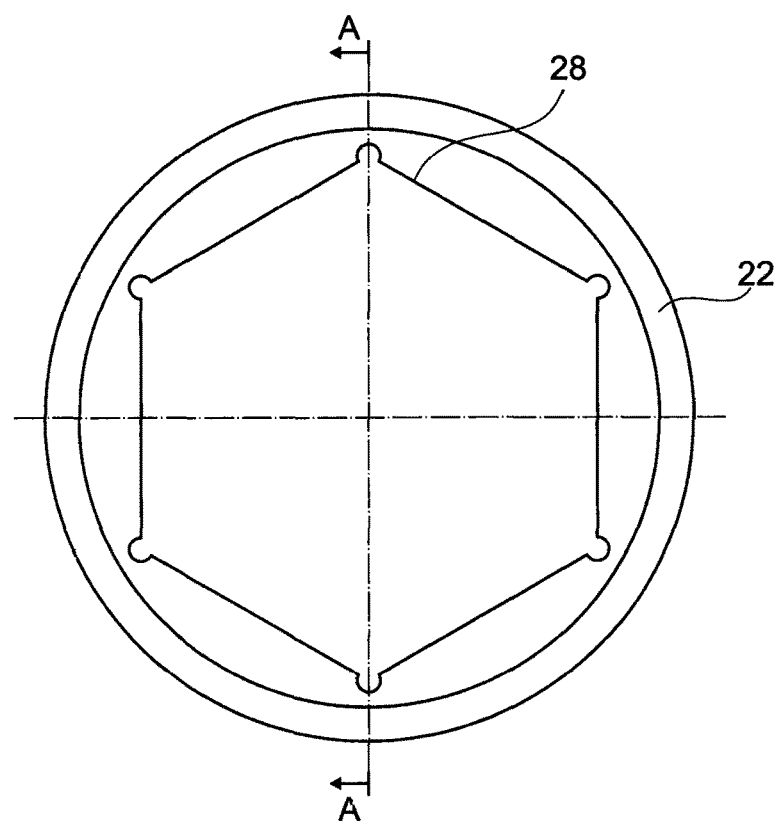
FIGS. 5 and 6 illustrate first and second parts of the retaining device in a second embodiment.
Figure 5:
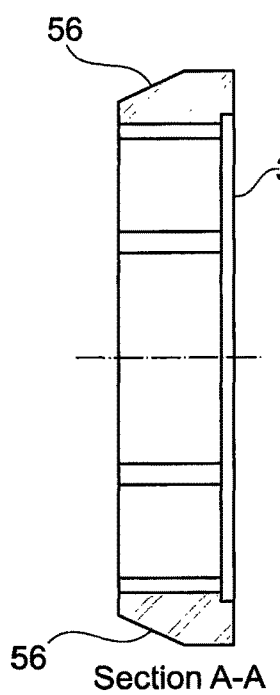

In the embodiment shown in FIGS. 5 and 6, the same reference numerals for the same features as the embodiment shown in FIGS. 3 and 4 are used for ease of reference. In FIGS. 5 and 6 the engagement means comprise, on the first part 22, an angled external side wall portion 56 which is provided at a first angle. The second part 24 of the device, is also provided with an angled wall portion 58 on the side wall which defines the recessed portion 34 in which the first part 22 is received. The respective side walls 56, 58 are formed with respective angles such that when the first part is received within the recess portion 34 of the second part, the angled walls engage in such a manner as to prevent relative rotation between the first and second parts. Thus, when the second part is secured in position on the body of the valve assembly, the same is non-rotatable with respect to the valve body. In turn, the first part is not rotatable with respect to the second part of the device due to the engagement of the angled walls 56, 58 and, in turn, the connector is not rotatable with respect to the first part of the device due to the contact between the flat surfaces and side walls 28, 30.

The use of the angled side walls rather than the toothed engagement means allows an infinite number of relative positions of the first and second parts of the device rather than a fixed number of possible positions as is the case with the toothed engagement means. The use of the angled side walls also avoids the need to over or undertighten valve components such as end connectors, bonnets or plugs when assembled at the factory or on site.

In all embodiments of the invention the device can be released in order to allow the connector to be removed from the valve body so that the connector and components connected thereto can be removed for maintenance as well as the valve body being maintained. The connectors, components and the retaining device can thereafter be placed back in position on the valve body to allow the same to be used and with the provision of the device as described herein this can be achieved easily whilst at the same time ensuring that the connector is then again retained in position. The provision of the device in the manner described allows the same to be relatively rugged and to allow uniform load delivery by the provision of the securing means on the device and valve body located on opposing sides of the device. This is in contrast to conventional devices in which the load on any retention device is at a single point and which can lead to the same being susceptible to failure. The appearance of the retaining device in accordance with the application also allows the same to act as an indicator that a valve component which is connected to the valve body via the connector body has been retained in position by the retaining device as the device is visually distinguishable when mounted on the valve body.

This therefore means that the device as a whole, and the connector and components located thereon, are maintained in the desired position with respect to the valve body during fitting of the same to the valve body and thereafter during subsequent use of the valve assembly and over tightening and loosening of the connector is therefore not possible.

The invention claimed is:

1. A retaining device for use to prevent rotation of a valve component relative to a valve body with which the valve component is located by a screw threaded engagement, said retaining device comprising first and second parts, the first part having a first aperture shaped to mate with a portion of the valve component to prevent relative rotational movement of the first part and the valve component, the second part including a second aperture having a recess portion that receives the first part to allow the second part to be located on the valve body adjacent to the valve component and said first and second parts are provided with mutual engagement surfaces which, when engaged, prevent relative rotational movement between the first and second parts, wherein the second part is provided with lugs for attachment of the second part to the valve body so that the valve component cannot rotate.

2. The retaining device according to claim 1 wherein the mutual engagement surfaces comprise, in one of the first or second parts, side walls at a first angle and in the other first or second parts, side walls at a second angle which differs from the first angle.

3. The retaining device according to claim 2 wherein the respective first and second angles of the side walls differ so as to encourage engagement between the first and second parts when the same are located together.

4. The retaining device according to claim 2 wherein the side walls of the first and second parts are provided in a frustoconical form.

5. The retaining device according to claim 1 wherein the mutual engagement surfaces comprise a series of teeth on the first part and a series of teeth on the second part which when engaged prevent relative rotational movement between the first and second parts.

6. The retaining device according to claim 5 wherein spacing between the teeth of at least one of the series of teeth is selected so as to provide a predetermined restriction on an amount of relative rotational movement between the first and second parts.

7. The retaining device according to claim 1 wherein the lugs are positioned to engage with ports at predetermined locations on the valve body.

8. The retaining device according to claim 7 wherein first and second ports on the valve body and first and second lugs on the second part are provided along a common axis and located on either side of the valve component.

9. The retaining device according to claim 1 wherein the retaining device is fitted to the valve body and the valve component under factory conditions and prior to a valve assembly being tested.

10. The retaining device according to claim 1, wherein the second part includes additional lugs for attachment of one or more accessories.

11. A valve assembly, said valve assembly including a valve body and, at one or more locations on the valve body, there is provided a threaded aperture for the reception of a threaded valve component, said threaded valve component driven into the threaded aperture to locate the threaded valve component with the valve body; wherein the valve assembly includes a retaining device, said retaining device including a first part having a first aperture shaped to mate with a portion of the threaded valve component to prevent relative rotational movement of the first part and the threaded valve component and a second part which includes a second aperture having a recess portion that receives the first part to allow the second part to be secured to the valve body; wherein the first and second parts of the retaining device are provided with mutual engagement surfaces to prevent relative rotational movement between the first and second parts once the said parts are respectively located with the threaded valve component and the valve body; wherein the second part is provided with lugs for attachment of the second part to the valve body and when the retaining device is connected thereto, the retaining device prevents relative rotational movement between the threaded valve component and the valve body.

12. The valve assembly according to claim 11 wherein the first part of the retaining device is provided as an integral part of the threaded valve component and/or the second part is provided as an integral part of the valve body.

13. The valve assembly according to claim 11 wherein the threaded valve component is a threaded connector piece to allow a device to be fitted thereto in communication with a channel running through the valve body.

14. A method of securing a threaded valve component in a pre-determined position on a valve assembly, said method comprising the steps of driving the threaded valve component into a threaded aperture in a valve body, placing a first part of a retaining device in contact with or adjacent to the threaded valve component such that at least one portion of the threaded valve component engages with a portion of the first part to prevent relative rotational movement of the first part and the threaded valve component, placing a recess portion of a second part of the retaining device which receives the first part so that the first and second parts have mutual engagement surfaces that engage to prevent relative rotational movement of the first part and the second part, and securing the second part to the valve body to prevent relative rotational movement of the threaded valve component and the valve body.

15. The method according to claim 14 wherein lugs for attachment of the second part to the valve body are provided along a common axis passing through a center of the second part on either side of a recess portion of the second part in which the first part is received.

16. The method according to claim 14 wherein the threaded valve component passes through a first aperture provided in the first part.

17. A retaining device for use to prevent rotation of a valve component relative to a valve body with which the valve component is located by a screw threaded engagement, said retaining device comprising first and second parts, the first part having a first aperture shaped to receive and mate with a portion of the valve component to prevent relative rotational movement of the first part and the valve component, the second part including a second aperture having a recess portion that receives the first part and lugs to allow the second part to be located on and fixed to the valve body adjacent to the valve component and wherein said first and second parts are provided with mutual engagement surfaces which, when engaged, prevent relative rotational movement between the first and second parts; wherein the mutual engagement surfaces comprise, in one of the first or second parts, side walls at a first angle and in the other first or second parts, side walls at a second angle which differs from the first angle; wherein the first and second angles of the side walls of the first and second parts are provided in a frustoconical form.

* * * * *